United States Patent
Wu et al.

(10) Patent No.: US 10,582,234 B2
(45) Date of Patent: Mar. 3, 2020

(54) BITSTREAM ALIGNMENT AND SYNCHRONOUS PROCESSING METHOD TRANSMITTING TERMINAL, RECEIVING TERMINAL AND COMMUNICATION SYSTEM

(71) Applicant: ZTE CORPORATION, Guangdong (CN)

(72) Inventors: Zhao Wu, Guangdong (CN); Ming Li, Guangdong (CN); Guoqiang Shang, Guangdong (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/579,310

(22) PCT Filed: Feb. 15, 2016

(86) PCT No.: PCT/CN2016/073823
§ 371 (c)(1),
(2) Date: Dec. 4, 2017

(87) PCT Pub. No.: WO2016/192413
PCT Pub. Date: Dec. 8, 2016

(65) Prior Publication Data
US 2018/0176617 A1    Jun. 21, 2018

(30) Foreign Application Priority Data

Jun. 4, 2015   (CN) .......................... 2015 1 0304991

(51) Int. Cl.
*H04N 19/40*      (2014.01)
*H04N 19/65*      (2014.01)
(Continued)

(52) U.S. Cl.
CPC ..... *H04N 21/23611* (2013.01); *H04N 19/187* (2014.11); *H04N 19/30* (2014.11);
(Continued)

(58) Field of Classification Search
CPC ......... H04N 21/23611; H04N 21/4342; H04N 19/187; H04N 21/4346; H04N 21/23614;
(Continued)

(56) References Cited

U.S. PATENT DOCUMENTS 6,181,872 B1 *  1/2001  Yamane ........... G11B 20/00007
                                                                386/332
6,188,987 B1 *  2/2001  Fielder ............. H04N 21/23602
                                                                375/E7.271
(Continued)

FOREIGN PATENT DOCUMENTS

CN    101951506 A    1/2011
CN    102480634 A    5/2012
(Continued)

OTHER PUBLICATIONS

ITU_T; "Series H: Audiovisual and Multimedia Systems Infrastructure of audiovisual services—Coding of moving video" Apr. 2015 (Year: 2015).*

(Continued)

*Primary Examiner* — Philip P. Dang
(74) *Attorney, Agent, or Firm* — McDonald Hopkins LLC

(57) ABSTRACT

Disclosed are a bitstream alignment and synchronous processing method, transmitting terminal, receiving terminal and communication system. The method includes: configuring, when multiple bitstreams are required to be aligned, by a transmitting terminal, alignment auxiliary information in the multiple bitstreams so as to store the same or transmit the same to a receiving terminal; and acquiring, by the receiving terminal, the multiple bitstreams, and synchronizing each of the bitstreams of a different standard according to the alignment auxiliary information carried in each of the bitstreams.

17 Claims, 2 Drawing Sheets

(51) Int. Cl.

| | | |
|---|---|---|
| *H04N 21/236* | (2011.01) | |
| *H04N 21/434* | (2011.01) | |
| *H04N 21/2343* | (2011.01) | |
| *H04N 19/70* | (2014.01) | |
| *H04N 19/68* | (2014.01) | |
| *H04N 19/30* | (2014.01) | |
| *H04N 21/845* | (2011.01) | |
| *H04N 19/187* | (2014.01) | |
| *H04N 21/2365* | (2011.01) | |

(52) U.S. Cl.
CPC ............. *H04N 19/68* (2014.11); *H04N 19/70* (2014.11); *H04N 21/236* (2013.01); *H04N 21/2365* (2013.01); *H04N 21/23614* (2013.01); *H04N 21/234327* (2013.01); *H04N 21/434* (2013.01); *H04N 21/4342* (2013.01); *H04N 21/4346* (2013.01); *H04N 21/4348* (2013.01); *H04N 21/845* (2013.01)

(58) Field of Classification Search
CPC ........... H04N 21/4348; H04N 21/2365; H04N 19/30; H04N 21/234327; H04N 21/434; H04N 21/845; H04N 19/70; H04N 19/68; H04N 21/236
See application file for complete search history.

(56) References Cited

U.S. PATENT DOCUMENTS

| | | | | |
|---|---|---|---|---|
| 7,010,037 | B2* | 3/2006 | Ye | H04N 19/147 |
| | | | | 375/240.1 |
| 8,289,998 | B2* | 10/2012 | Kim | H04N 21/235 |
| | | | | 370/474 |
| 8,436,889 | B2* | 5/2013 | Eleftheriadis | H04N 7/152 |
| | | | | 348/14.09 |
| 8,503,541 | B2* | 8/2013 | Narasimhan | H04N 21/2368 |
| | | | | 375/240.01 |
| 8,782,531 | B2* | 7/2014 | Lawther | G06F 3/1423 |
| | | | | 715/744 |
| 8,948,241 | B2* | 2/2015 | Chen | H04N 21/234327 |
| | | | | 375/240 |
| 9,071,344 | B2* | 6/2015 | Smee | H04B 1/7107 |
| 9,253,240 | B2* | 2/2016 | Chen | H04N 21/235 |
| 9,313,486 | B2* | 4/2016 | Boyce | H04N 19/70 |
| 9,357,275 | B2* | 5/2016 | Nagaraj | H04N 21/4384 |
| 9,571,893 | B2* | 2/2017 | Kim | H04N 21/23439 |
| 9,578,302 | B2* | 2/2017 | Suh | H04N 21/234327 |
| 9,596,486 | B2* | 3/2017 | Ramasubramonian | H04N 19/895 |
| 9,602,802 | B2* | 3/2017 | Chen | H04N 19/597 |
| 9,602,822 | B2* | 3/2017 | Rapaka | H04N 19/70 |
| 9,628,771 | B2* | 4/2017 | Park | H04N 21/2362 |
| 9,641,862 | B2* | 5/2017 | Hannuksela | H04N 19/119 |
| 9,648,317 | B2* | 5/2017 | Wang | H04N 19/70 |
| 9,774,927 | B2* | 9/2017 | Rusert | H04N 21/234327 |
| 9,813,722 | B2* | 11/2017 | Hannuksela | H04N 19/70 |
| 9,992,555 | B2* | 6/2018 | Chen | G11B 27/007 |
| 10,154,274 | B2* | 12/2018 | Lainema | H04N 19/70 |
| 2007/0165717 | A1* | 7/2007 | Ye | H04N 19/176 |
| | | | | 375/240.16 |
| 2012/0069927 | A1* | 3/2012 | Oyman | H04L 1/0019 |
| | | | | 375/285 |
| 2012/0185570 | A1* | 7/2012 | Bouazizi | H04N 21/44016 |
| | | | | 709/219 |
| 2014/0016694 | A1 | 1/2014 | Boyce et al. | |
| 2014/0098883 | A1* | 4/2014 | Hannuksela | H04N 19/80 |
| | | | | 375/240.16 |
| 2014/0286411 | A1* | 9/2014 | Jeong | H04N 19/593 |
| | | | | 375/240.12 |
| 2015/0016503 | A1* | 1/2015 | Rapaka | H04N 19/70 |
| | | | | 375/240.02 |
| 2015/0264404 | A1* | 9/2015 | Hannuksela | H04N 19/70 |
| | | | | 375/240.16 |
| 2015/0312581 | A1* | 10/2015 | Sato | H04N 19/105 |
| | | | | 375/240.02 |
| 2016/0044324 | A1* | 2/2016 | Deshpande | H04N 19/70 |
| | | | | 375/240.25 |

FOREIGN PATENT DOCUMENTS

| | | | |
|---|---|---|---|
| CN | 104754347 A | | 7/2015 |
| CN | 104754358 A | | 7/2015 |
| EP | 2 478 703 B1 | * | 9/2010 |
| WO | WO 2015/037373 A1 | | 3/2015 |

OTHER PUBLICATIONS

International Search Report dated May 23, 2016 issued in PCT/CN2016/073823.
Supplementary European Search Report issued in corresponding Application No. EP 16 80 2336.4 dated Apr. 19, 2018.
Hannuksela, M. M., et al., "MV-HEVC/SHVC HLS: on POC value derivation" Joint Collaborative Team on Video Coding (JCT-VC) of ITU-T SG 16 WP 3 and ISO/IEC JTC 1/SC 29/WG 11 Document: JCTVC-O0275, Joint Collaborative Team on 3D Video Coding Extensions of ITU-T SG 16 WP 3 and ISO/IEC JTC 1/SC 29/WG 11 Document JCT3V-F0092, pp. 1-2 (2013).
Li M., et al., "MV-HEVC/SHVC HLS: Comments on POC alignment" Joint Collaborative Team on Video Coding (JCT-VC) of ITU-T SG 16 WP 3 and ISO/IEC JTC 1/SC 29/WG 11 Document: JCTVC-P0067, Joint Collaborative Team on 3D Video Coding Extensions of ITU-T SG 16 WP 3 and ISO/IEC JTC 1/SC 29/WG 11 Document JCT3V-G0045, pp. 1-6 (2014).
Li M., et al., "MV-HEVC/SHVC HLS: on picture order count" Joint Collaborative Team on Video Coding (JCT-VC) of ITU-T SG 16 WP 3 and ISO/IEC JTC 1/SC 29/WG 11 Document: JCTVC-O0213, Joint Collaborative Team on 3D Video Coding Extensions of ITU-T SG 16 WP 3 and ISO/IEC JTC 1/SC 29/WG 11 Document JCT3V-F0073, pp. 1-10 (2013).

* cited by examiner

BITSTREAM ALIGNMENT AND SYNCHRONOUS PROCESSING METHOD TRANSMITTING TERMINAL, RECEIVING TERMINAL AND COMMUNICATION SYSTEM

CROSS-REFERENCE TO RELATED APPLICATION

This application is the 371 application of PCT Application No. PCT/CN2016/073823, filed Feb. 15, 2016, which is based upon and claims priority to Chinese Patent Application No. 201510304991.7, filed Jun. 4, 2015, the entire contents of which are incorporated herein by reference.

TECHNICAL FIELD

The present disclosure relates to the field of communications, and more particularly, to a bitstream alignment and synchronization processing method, a transmitting terminal, a receiving terminal and a communication system.

BACKGROUND

A new generation video compression standard H.265/HEVC (High Efficiency Video Coding) jointly developed by ITU-T/VCEG (Video Coding Experts Group) and ISO/IEC MPEG continues the style of last generation video standard H.264/AVC and is compatible with scalable video coding (Scalable Video Coding). But different from H.264/AVC, H.265/HEVC puts forward a request for multiple coding standards jointed scalable coding (Different Coding Standards with Scalability). The currently released H.265/HEVC standard (Version 2014-10) is known as the "H.265/HEVC Version 2" standard. In Version 2, information used for indicating a base layer (Base Layer) is provided for hybrid coding (Hybrid Scalability), while how to put a picture of the base layer (Base Layer) into a reference frame management of an enhancement layer (Enhancement Layer) is implemented by using an external means (External Means), and the external means is not explained in Version 2.

It is expected that devices using H.264/AVC will be widely used in next few years, and H.264/AVC will be the main video coding protocol for digital videos throughout the world. Therefore, developing a new generation scalable video coding standard compatible with H.264/AVC will be very useful in a standard migration process.

The multiple coding standards jointed scalable coding refers to the combination of two bitstreams of different video standards according to a certain rule, and is also known as multi-protocol hybrid coding (Hybrid Coding). For example, in spatial scalability (Spatial Scalability), the base layer (Base Layer) contains a bitstream in which Constrained Baseline Profile, Main Profile and High Profile of H.264/AVC standard are compatible, and the enhancement layer (Enhancement Layer) includes a basic bitstream of HEVC. Pictures in the two layers may have the same size or different sizes, i.e., low resolution is adopted in H.264/AVC, and high resolution is adopted in H.265/HEVC. The base layer of the spatial scalability coding may also use a bitstream of MPEG-2, which is combined with a bitstream of the enhancement layer of H.265/HEVC to form the hybrid coding. For another example, in a view scalability (View Scalability), the base layer is a view using an H.264/AVC coding manner, and the enhancement layer is another view using a H.265/HEVC format and taking the base layer as a reference. The base layer of multiple coding standards jointed hybrid coding is not limited to H.264/AVC or MPEG-2.

A scalable bitstream composed of the bitstreams with the same protocol may be synchronized in various manners. For example, a video picture obtained at the same time in H.264/AVC and its corresponding coded bits form an access unit (Access Unit, AU). Therefore, the pictures in different layers may be synchronized through an AU scope. In H.265/HEVC, syntactic information such as POC (Picture Order Count) in a video bitstream may be used. For bitstreams of two layers or multiple layers of different video coding protocols, codecs thereof are respectively independent codecs, and syntactic information contained in different video bitstreams is slightly different. Therefore, to pack the bitstreams in what form or to provide what syntactic information to ensure synchronization is a problem that needs to be solved for hybrid coding (Hybrid Coding).

To this issue, one of the existing methods is to pack the bitstreams of H.264/AVC and H.265/HEVC as a whole and transmit the bitstreams by an internal means. In other words, the existing form of the bitstream of H.264/AVC may be indicated by adding some syntactic elements in H.265/HEVC. There are many related proposals in JCT-VC standard conference. For example, JCTVC-N0050 proposes a solution regarding hybrid bitstreams of AVC-HEVC and adds a new NAL header of H.265/HEVC (nal_unit_type=ENC_NUT) to a H.264/AVC NAL unit, which is packed as a HEVC NAL unit; avc_base_layer_flag is added in a VPS extension to indicate whether avc_base_profile_level_idc exists, while the avc_base_profile_level_idc indicates the capability set (profile) of H.264/AVC. The disadvantage of this means is that a standard H.264/AVC decoder cannot decode such a bitstream, and it needs to unpack the header information of the NAL unit corresponding to H.265/HEVC and then it can decode correctly.

JCTVC-O0190 proposes another different packing strategy with respect to JCTVC-N0050. It also proposes to pack the bitstreams of H.264/AVC and H.265/HEVC as a whole, but the H.264/AVC NAL unit of the base layer is unchanged while the H.265/HEVC NAL unit of the enhancement layer is added with one prefix byte (0x16) for the H.264/AVC decoder to identify that this portion of bitstreams cannot be decoded and discard the bitstreams, and the internal means is still used in the bitstream portion thereof. Meanwhile, it is suggested to add a variable HevcPrefixBytePresent, which indicates to the decoder that this prefix byte needs to be parsed. This means needs to add information that can identify different bitstreams in the NAL header or in front of the NAL header, while the decoder has to be capable of identifying the bitstreams belonging to it and the bitstreams not belonging to it. Therefore, a corresponding processing needs to be added in either the H.264/AVC decoder or the H.265/HEVC decoder if it wants to support the function of hybrid coding (Hybrid Coding). This function cannot be achieved without changing or slightly changing the decoder in the existing device.

It is apparent that the existing means transmits the bitstreams of different video standards on the basis of the internal means, and its alignment or synchronization processing needs to modify the existing coding and decoding devices, which has the effects of complicated implementation process, poor universality and high implementation cost.

This section provides background information related to the present disclosure which is not necessarily prior art.

SUMMARY

The main technical problem to be solved by the present disclosure is to provide a bitstream alignment and synchronization processing method, a transmitting terminal, a receiving terminal and a communication system, so as to solve the problems of complicated implementation process, poor universality and high implementation cost of alignment and synchronization processing regarding a plurality of different video bitstreams.

In order to solve the foregoing technical problems, the present disclosure provides a bitstream alignment method, including:

when multiple bitstreams need to be aligned, setting, by a transmitting terminal, alignment auxiliary information in the multiple bitstreams; and storing the multiple bitstreams or transmitting the multiple bitstreams to a receiving terminal, by the transmitting terminal.

In one embodiment of the present disclosure, the bitstreams are video bitstreams; and the setting, by the transmitting terminal, the alignment auxiliary information in the multiple bitstreams includes: setting the alignment auxiliary information in at least one of a video layer, a system layer and an application layer of the multiple bitstreams.

In one embodiment of the present disclosure, the setting, by the transmitting terminal, the alignment auxiliary information in the video layer of the multiple bitstreams includes: setting the alignment auxiliary information in at least one field of the following fields of the video layer:

a field corresponding to enhancement information;
a field corresponding to video usability information;
a field corresponding to video shared information;
a field corresponding to slice header information; and
other field of the video layer of the bitstream excluding the above fields, said other field at least contains one picture.

In one embodiment of the present disclosure, the setting, by the transmitting terminal, the alignment auxiliary information in the system layer of the multiple bitstreams includes: setting the alignment auxiliary information in a field of the system layer which is configured to describe a video media attribute.

In one embodiment of the present disclosure, the setting, by the transmitting terminal, the alignment auxiliary information in the application layer of the multiple bitstreams includes: setting the alignment auxiliary information in a field of a media file which is configured to describe a video media attribute, and/or in a field of the application layer which is configured to describe a video media attribute.

In one embodiment of the present disclosure, positions and/or contents of the alignment auxiliary information in the multiple bitstreams are set to be the same by the transmitting terminal.

In one embodiment of the present disclosure, numbers and/or contents of the alignment auxiliary information in the multiple bitstreams are set to be different by the transmitting terminal.

In one embodiment of the present disclosure, the transmitting the multiple bitstreams to the receiving terminal by the transmitting terminal includes: transmitting, by the transmitting terminal, the multiple bitstreams respectively and independently to the receiving terminal; or, packing at least two of the multiple bitstreams into one bitstream and then transmitting the packed bitstream to the receiving terminal, by the transmitting terminal; or, splitting and recombining the multiple bitstreams into multiple bitstreams and then transmitting the recombined bitstreams to the receiving terminal, by the transmitting terminal.

In one embodiment of the present disclosure, the storing the multiple bitstreams by the transmitting terminal includes: writing the multiple bitstreams into one file for storing, or respectively writing the multiple bitstreams into independent files for storing, or splitting and recombining the multiple bitstreams and then writing the multiple bitstreams into different files for storing.

In one embodiment of the present disclosure, the alignment auxiliary information includes an alignment scalar content, or further includes alignment instruction information when including an alignment scalar content.

In one embodiment of the present disclosure, the alignment scalar content includes at least one of picture absolute time information, picture relative time information, picture decoding sequence information, picture playing sequence information, a picture separator and a picture specific delimiter.

In one embodiment of the present disclosure, when the alignment auxiliary information includes the alignment instruction information, the alignment instruction information includes alignment flag information and/or type information.

In one embodiment of the present disclosure, the multiple bitstreams are two video bitstreams of different video standards, and one of the two video bitstreams is a video bitstream of H.265/HEVC.

In order to solve the foregoing problems, the present disclosure further provides a bitstream receiving method, including:

acquiring, by a receiving terminal, multiple bitstreams;
synchronizing, by the receiving terminal, the multiple bitstreams according to alignment auxiliary information when the multiple bitstreams carry the alignment auxiliary information set by a transmitting terminal.

In one embodiment of the present disclosure, the bitstreams are video bitstreams, and the receiving terminal searches the alignment auxiliary information from at least one of an application layer, a system layer and a video layer of the multiple bitstreams.

In one embodiment of the present disclosure, when inconsistent alignment auxiliary information exists in multiple layers of one bitstream, the alignment auxiliary information of one layer is selected from the alignment auxiliary information according to a preset rule for synchronization processing.

In one embodiment of the present disclosure, the preset rule includes:

selecting alignment auxiliary information in a layer with a high channel transmission reliability;

or, when alignment auxiliary information exists in the video layer, selecting the alignment auxiliary information in the video layer; otherwise, selecting the alignment auxiliary information in a layer closest to the video layer;

or, selecting the alignment auxiliary information in an effective layer needing to be decoded by the receiving terminal.

In one embodiment of the present disclosure, when completed alignment auxiliary information exists in a layer of one bitstream with a relatively low channel transmission reliability, while alignment auxiliary information existing in a layer with a relatively high channel transmission reliability is incomplete or missing, the alignment auxiliary information in the layer with the relatively low channel transmission reliability is selected for synchronization processing;

or, when completed alignment auxiliary information exists in other layer of one bitstream excluding the video layer, while alignment auxiliary information existing in the video layer is incomplete or missing, the alignment auxiliary information in said other layer excluding the video layer is selected for synchronization processing.

In one embodiment of the present disclosure, the alignment auxiliary information at least includes an alignment scalar content, and the receiving terminal synchronizes the multiple bitstreams according to the alignment scalar content.

In order to solve the foregoing problems, the present disclosure further provides a bitstream processing method, including:

when multiple bitstreams need to be aligned, setting, by a transmitting terminal, alignment auxiliary information in the multiple bitstreams;

storing the multiple bitstreams or transmitting the multiple bitstreams to a receiving terminal, by the transmitting terminal;

acquiring, by the receiving terminal, the multiple bitstreams; and synchronizing, by the receiving terminal, the multiple bitstreams according to the alignment auxiliary information when the multiple bitstreams carry the alignment auxiliary information.

In order to solve the foregoing problems, the present disclosure further provides a processing module and a transmitting module, wherein:

the processing module is configured to, when multiple bitstreams need to be aligned, set alignment auxiliary information in the multiple bitstreams; and the transmitting module is configured to store the multiple bitstreams, or transmit the multiple bitstreams to a receiving terminal.

In one embodiment of the present disclosure, the bitstreams are video bitstreams, and the processing module includes a writing submodule configured to set the alignment auxiliary information in at least one of a video layer, a system layer and an application layer of the multiple bitstreams.

In order to solve the foregoing problems, the present disclosure further provides an acquisition module and an execution module, wherein:

the acquisition module is configured to acquire multiple bitstreams; and the execution module is configured to, when the multiple bitstreams carry alignment auxiliary information set by a transmitting terminal, synchronize the multiple bitstreams according to the alignment auxiliary information.

In one embodiment of the present disclosure, the execution module includes a searching submodule configured to search the alignment auxiliary information from at least one of an application layer, a system layer and a video layer of the multiple bitstreams.

In order to solve the foregoing problem, the present disclosure further provides a communication system, including the transmitting terminal as described above and the receiving terminal as described above, wherein:

the transmitting terminal sets, when multiple bitstreams need to be aligned, alignment auxiliary information in the multiple bitstreams respectively, and stores the multiple bitstreams, or transmits the multiple bitstreams to the receiving terminal; and the receiving terminal acquires the multiple bitstreams, and synchronizes the multiple bitstreams according to the alignment auxiliary information when the multiple bitstreams carry the alignment auxiliary information.

The present invention has the following beneficial effects:

according to the bitstream alignment and synchronization processing methods, the transmitting terminal, the receiving terminal and the communication system, the transmitting terminal, when the multiple bitstreams need to be aligned, sets the alignment auxiliary information in the multiple bitstreams, and then stores the multiple bitstreams or transmits the multiple bitstreams to the receiving terminal; after receiving the multiple bitstreams, the receiving terminal may synchronize the bitstreams of different standards according to the alignment auxiliary information carried in various bitstreams. It can be seen that, the present disclosure directly sets the alignment auxiliary information in various bitstream, which is easy to achieve, does not need additional modifications to a codec basically, and has a good universality and a low implementation cost.

This section provides a summary of various implementations or examples of the technology described in the disclosure, and is not a comprehensive disclosure of the full scope or all features of the disclosed technology.

DETAILED DESCRIPTION

In order to reduce changes to the existing coding and decoding devices as much as possible, the transmitting end, when determining that the bitstreams need to be aligned, sets the alignment auxiliary information (the alignment auxiliary information is used with regard to the transmitting end, and is used for synchronization with regard to the receiving end, and thus can also be called synchronization auxiliary information for the receiving end) into various bitstreams of different standards, and the receiving end, after acquiring the bitstreams, may complete synchronization processing according to the alignment auxiliary information in various bitstreams. The present disclosure directly sets the alignment auxiliary information in various bitstreams, which is easy to achieve, does not need additional modifications to a codec basically, and has a good universality and a low implementation cost. The present disclosure will be further described hereinafter in detail with reference to the drawings and specific embodiments.

First Embodiment

Figure 1:
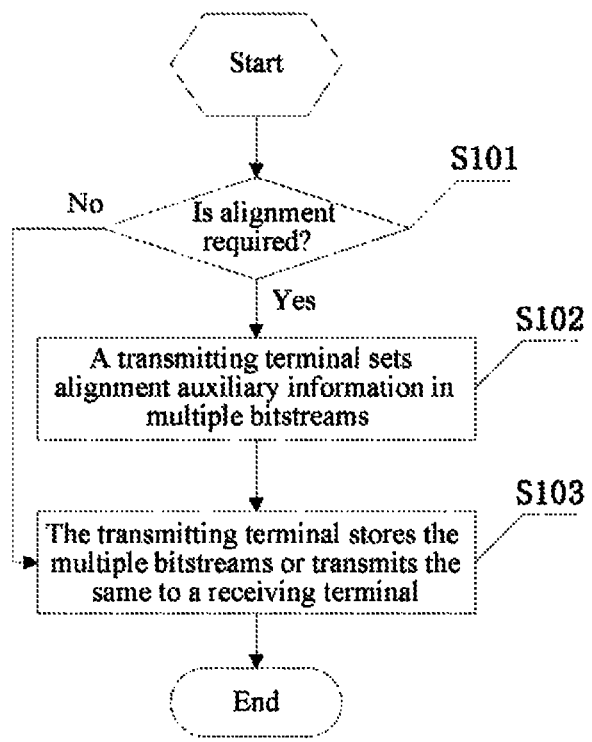
FIG. 1 is a flow chart of a bitstream alignment method completed by a transmitting end according to a first embodiment of the present disclosure.

In this embodiment, a transmitting end, when determining that current multiple bitstreams need to be aligned, sets alignment auxiliary information in the multiple bitstreams respectively, and then stores the multiple bitstreams, or transmits the multiple bitstreams to a receiving terminal. The specific process is as shown in FIG. 1, including the following steps.

In step 101, a transmitting terminal determines whether current multiple bitstreams need to be aligned; if yes, the process goes to step 102; otherwise, the process goes to step 103.

In step 102, the transmitting terminal sets alignment auxiliary information in the multiple bitstreams.

In step 103, the transmitting terminal stores the multiple bitstreams, or transmits the multiple bitstreams to the receiving terminal. Here, the storage may means that the multiple bitstreams are stored locally or stored on a corresponding server, or stored locally and on the server at the same time, and the bitstreams may be stored in a form of files.

The above-mentioned step 101 is conducted when the transmitting terminal needs to transmit the current multiple bitstreams. To be specific, the transmitting terminal may judge whether it is necessary to conduct an alignment processing on the current multiple bitstreams according to an application demand. The application demand may be determined according to a specific demand of a user, or a specific application environment, or other factors, for example, whether a coder uses an AVC picture of a base layer as a reference for an HEVC picture of an enhancement layer, or whether the AVC picture and the HEVC picture need to be outputted synchronously.

It is to be understood that the bitstream in this embodiment may either be a video bitstream, or other bitstreams in the system layer; and the embodiment does not make any restrictions on the specific bitstream types. At the same time, it should be understood that the multiple bitstreams in this embodiment may be multiple bitstreams of the same standard, and may also be multiple bitstreams of different standards, which depends on specific application scenarios. The alignment or synchronization operation of the multiple bitstreams with the above conditions may be achieved by the solution shown in FIG. 1. In the following, the embodiment is exemplarily illustrated by taking the video bitstream as an example.

In the above-mentioned step 102, when the transmitting terminal sets the alignment auxiliary information in the multiple bitstreams, it is necessary to determine a specific location in each video bitstream where the alignment auxiliary information is needed to be set. In this embodiment, the transmitting terminal may set the alignment auxiliary information in at least one of a video layer, a system layer and an application layer of the multiple bitstreams. When the transmitting terminal sets the alignment auxiliary information in various bitstreams, the existing information in the bitstreams may be directly used as the alignment auxiliary information, or new content may be added in the bitstreams and used as the alignment auxiliary information.

To be specific, when the transmitting terminal sets the alignment auxiliary information in the video layer of the multiple bitstreams, the method includes the step of setting the alignment auxiliary information in at least one of the following fields of the video layer:

(1) a field corresponding to enhancement information, used for aligning or synchronizing a picture in the bitstream within an effective range of the field with a picture of a corresponding bitstream possessing a corresponding flag and content information; for example, for a video bitstream of H.265/HEVC, the field corresponding to enhancement information is specifically a supplemental enhancement information (Supplemental Enhancement Information, SEI) field, which is used to indicate the picture in the bitstream within the effective range of the SEI information to be aligned or synchronized with the picture of the corresponding bitstream possessing the corresponding flag and content information; correspondingly, the field corresponding to the enhancement information of the video bitstream of H.264/AVC is specifically an SEI field; it should be understood that for other formats of bitstreams, a field having a similar function may be selected as the field corresponding to the enhancement information, for example, in MPEG-2 and MPEG-4, the user-defined corresponding field (User Data) is used by the user to complete the same function;

(2) a field corresponding to video usability information, used for indicating a picture in the bitstream within an effective range of this field to be aligned or synchronized with a picture of a corresponding bitstream possessing a corresponding flag and content information; for example, for the video bitstream of H.265/HEVC, the field corresponding to the video usability information is specifically a video usability information (Video Usability Information, VUI) field; for a video bitstream of H.264/AVC, the field corresponding to the video usability information is specifically a VUI field; correspondingly, for other formats of bitstreams, a field having a similar function may be selected as the field corresponding to the video usability information, for example, in MPEG-2 and MPEG-4, the user-defined corresponding field (User Data) is used by the user to complete the same function;

(3) a field corresponding to video shared information, used for indicating a picture in the bitstream within an effective range of parameter set information to be aligned or synchronized with a picture of a corresponding bitstream possessing the corresponding flag and content information; for example, for the video bitstream of H.265/HEVC, the field corresponding to the video shared information includes a video parameter set (Video Parameter Set, VPS), a sequence parameter set (Sequence Parameter Set, SPS) and a picture parameter set (Picture Parameter Set, PPS); correspondingly, for the video bitstream of H.264/AVC, the parameter set includes a sequence parameter set (SPS) and a picture parameter set (PPS); for a video bitstream of MPEG-4, the shared field of video information is a VOS (Visual Object Sequences) header, a VO (Visual Object) header, a VOL (Video Object Layer) header, a GOV (Group of Video Object Plane) header and a VOP (Video Object Plane) header; for a video bitstream of MPEG-2, the video information shared field is a Video Sequence header, a Group of pictures header and a Picture header; correspondingly, for other formats of bitstreams, a field having a similar function may be selected as the field corresponding to the video shared information;

(4) a field corresponding to slice header information, used for indicating a picture in the bitstream of an effective range of the slice header information to be aligned or synchronized with a picture of a corresponding bitstream possessing the same flag and content information; for example, for the video bitstream of H.265/HEVC, the field is a Slice Header field, for the video bitstream of H.264/AVC, the field is a Slice Header field, and for the video bitstream of MPEG-4, the field is a Video Packet Header field; correspondingly, for other formats of bitstreams, a field having a similar function may be selected as the slice header information field; it is worth noting that, in this embodiment, for the same video picture, the alignment auxiliary information may be set only in the first slice header, or besides the first header, the alignment auxiliary information may be set in at least one another slice header at the same time, and the alignment auxiliary information set in multiple slice headers are consistent;

(5) other field in the video layer of the bitstream excluding the above fields, said other field at least including one picture (frame picture or field picture), used for indicating whether to conduct an alignment or synchronization operation on a picture layer on which the corresponding data structure of the bitstream acts, for example, a user-defined data field (User Data) or extension field (Extension Data); and when the transmitting terminal sets the alignment auxiliary information in the system layer of the multiple bitstreams, the method specifically includes setting the alignment auxiliary information in the following fields of the system layer:

(6) a field in the system layer which is configured to describe a video media attribute, used for indicating a picture included in the system bitstream to be aligned or synchronized with a picture of a corresponding bitstream possessing the corresponding flag and content information; and when the transmitting terminal sets the alignment auxiliary information in the application layer of the multiple bitstreams, the method includes setting the alignment auxiliary information in at least one of the following fields:

(7) a field in a media file which is configured to describe a video media attribute, used for indicating a picture of the bitstream included in the media file to be aligned or synchronized with a picture of a corresponding bitstream possessing the corresponding flag and content information; and (8) a field in the application layer which is configured to describe a video media attribute, used for indicating a picture of the bitstream included in the application to be aligned or synchronized with a picture of a corresponding bitstream possessing the corresponding flag and content information.

For the contents in the above fields which are not necessary for the codec, the coder may discard them according to standard rules.

In this embodiment, the transmitting terminal may set the alignment auxiliary information in any one of the above fields of the various video bitstreams, or may set the alignment auxiliary information in multiple fields of the above fields of the various video bitstreams at the same time. For one video bitstream, the alignment auxiliary information may be theoretically set in any field of any layer mentioned above. However, in order to further improve the reliability and avoid missing or lack of the alignment auxiliary information caused by factors like transmission errors, the alignment auxiliary information may also be set in multiple fields at the same time. For example, the alignment auxiliary information may be set in at least one field of at least two layers of the video layer, the system layer, and the application layer of one bitstream.

Moreover, the positions at which the transmitting terminal sets the alignment auxiliary information in various video bitstreams may be the same or different; for example, when the multiple bitstreams are two video bitstreams of different standards, the alignment auxiliary information may be set at the same position for the two video bitstreams, for example, the alignment auxiliary information may be set in the field corresponding to enhancement information of the video layer for both of the two video bitstreams; the alignment auxiliary information may also be set at different positions; for example, the alignment auxiliary information of one bitstream is set in the field corresponding to enhancement information of the video layer, and the alignment auxiliary information of the other bitstream is set in the field corresponding to video shared information of the video layer; for another example, the alignment auxiliary information of one bitstream is set in the field of the system layer for describing a video media attribute, and the alignment auxiliary information of the other bitstream is set in the field of the application layer for describing a video media attribute.

In this embodiment, contents of the alignment auxiliary information set by the transmitting terminal in the multiple bitstreams may be the same or different, as long as the contents can characterize that an alignment operation needs to be performed and the contents can be correctly identified.

In this embodiment, numbers of the alignment auxiliary information set by the transmitting terminal in the multiple bitstreams may be the same or different, for example, when the multiple bitstreams are two video bitstreams of different standards, one alignment auxiliary information may be set in one of the two video bitstreams, and multiple alignment auxiliary information may be set in the other bitstream. The contents of the multiple alignment auxiliary information set in the same layer for one bitstream are the same.

In this embodiment, the alignment auxiliary information set by the transmitting terminal at least includes an alignment scalar content, or further includes alignment instruction information when including an alignment scalar content. The alignment scalar content in this embodiment includes at least one of picture absolute time information (i.e., a system time when performing the hybrid coding), picture relative time information, picture decoding sequence information, picture playing sequence information, a picture separator and a picture specific delimiter. As mentioned above, when the alignment scalar content is the picture decoding sequence information, and when picture decoding sequence information exists in the bitstream itself, then the original picture decoding order information in the bitstream may be directly used as the alignment auxiliary information for the bitstream; and for other bitstreams, the picture decoding sequence information may be added as the alignment auxiliary information.

When the alignment auxiliary information includes the alignment instruction information, the alignment instruction information may specifically be alignment flag information and/or type information. An exemplary explanation is given hereinafter with a specific example.

The alignment flag information and the type information of the alignment instruction information used in the following examples with respect to the alignment or synchronization operation adopt structures as shown in Table 1 and/or Table 2 respectively. The alignment scalar content adopts a structure as shown in Table 3. The bitstream as shown in Table 1 includes flag information that identifies whether the alignment or synchronization operation is adopted in the entire or a part of the bitstream. The bitstream as shown in Table 2 includes the type of the flag information that identifies the alignment or synchronization operation of the entire or a part of the bitstream. The bitstream as shown in Table 3 includes content information needed by the alignment or synchronization.

TABLE 1

| ...... | Descriptor |
|---|---|
| pic_alignment_flag | u(1) |
| ...... | |

TABLE 2

| | Descriptor |
|---|---|
| ...... | |
| pic_alignment_type( ) | |
| ...... | |

TABLE 3

| | Descriptor |
|---|---|
| ...... | |
| alignment_code( ) | |
| ...... | |

The semantic of the field in Table 1 is as follows: a value of pic_alignment_flag equal to 1 indicates that video pictures of different coding formats in the bitstream need an alignment or synchronization operation. The value of pic_alignment_flag equal to 0 represents that the video pictures of different coding formats in the bitstream do not need an alignment or synchronization operation. For those skilled in the art, other manners may also be adopted for the value of the pic_alignment_flag and the meaning represented thereof, which are not limited in the embodiment. Coding and decoding methods corresponding to different coding protocols are used in the pic_alignment_flag.

Optionally, if a bit field corresponding to the pic_alignment_flag does not exist in the bitstream, then the value of the corresponding variable pic_alignment_flag is 0 by default.

The semantic of the field in Table 2 (corresponding control operation) is as follows: pic_alignment_type ( ) represents to acquire type information. The type here refers to the field for storing the aligned or synchronized content information to be further extracted the type information needs to be acquired and then the aligned or synchronized content information may be further extracted. For those skilled in the art, other manners may also be adopted for inner forms of the pic_alignment_type( ) and the meaning represented thereof, which are not limited in the embodiment.

Optionally, if the pic_alignment_type( ) does not exist in the bitstream, then the corresponding type information thereof does not exist.

The semantic of the field in Table 3 (corresponding control operation) is as follows: alignment_code( ) includes data information needed for alignment or synchronization. The field in Table 3 may be used in combination with the fields in Table 1 and/or Table 2. One or more of the following information may be used for the alignment_code( ) in Table 3, including, but not limited to the following information: picture absolute time information, picture relative time information, picture decoding sequence information, picture playing sequence information, a picture separator, a picture special delimiter and so on.

The syntactic elements in Table 1, Table 2, and Table 3 may be set at a position where at least one field of the above (1) to (8) is located or a plurality of fields shown in the above (1) to (8) are mixed; and the bit fields corresponding to the syntactic elements in Table 1, Table 2 and Table 3 are used in the bitstream corresponding to the data structure.

In the above-mentioned step 103, when transmitting the multiple bitstreams to the receiving terminal, the transmitting terminal can flexibly select to respectively and independently transmit the multiple bitstreams to the receiving terminal according to the specific application scenarios, or, select to pack at least two of the multiple bitstreams into one bitstream, and then transmit the packed bitstream to the receiving terminal. For instance, when there are three bitstreams (respectively A, B, and C), the three bitstreams may be packed into one bitstream and then transmitted; it is also possible to pack two of the three bitstreams (such as A and B) into one bitstream, and then the one bitstream obtained after packing and the bitstream C are transmitted respectively and independently; and a similar method is adopted for processing the situations of more than three bitstreams. The multiple bitstreams may also be split and recombined into multiple bitstreams, and then transmitted to the receiving terminal.

In the above-mentioned step 103, when the transmitting terminal stores the multiple bitstreams, no matter the transmitting terminal stores the multiple bitstreams locally or on a server, the multiple bitstreams may be written into one file for storing, or the multiple bitstreams are respectively written into independent files for storing, or the multiple bitstreams are split and recombined, and then written into different files for storing.

Alternatively, the multiple bitstreams in this embodiment are specifically set to be two video bitstreams of different video standards, and one video bitstream (for example, an enhancement layer) is a video bitstream of H.265/HEVC and the other video bitstream (for example, a base layer) is a non video bitstream of H.265/HEVC, for instance, a video bitstream of H.264/AVC, a video bitstream of MPEG-2, a video bitstream of MPEG-4, a video bitstream of VC-1, a video bitstream of VP8, a video bitstream of AVS, etc. The multiple bitstreams in this embodiment may also be specifically configured as two video bitstream of the same video standard, and one video bitstream (for example, the base layer) is the video bitstream of H.265/HEVC, and the other video bitstream (for example, the enhancement layer) is also the video bitstream of H.265/HEVC.

Second Embodiment

Figure 2:
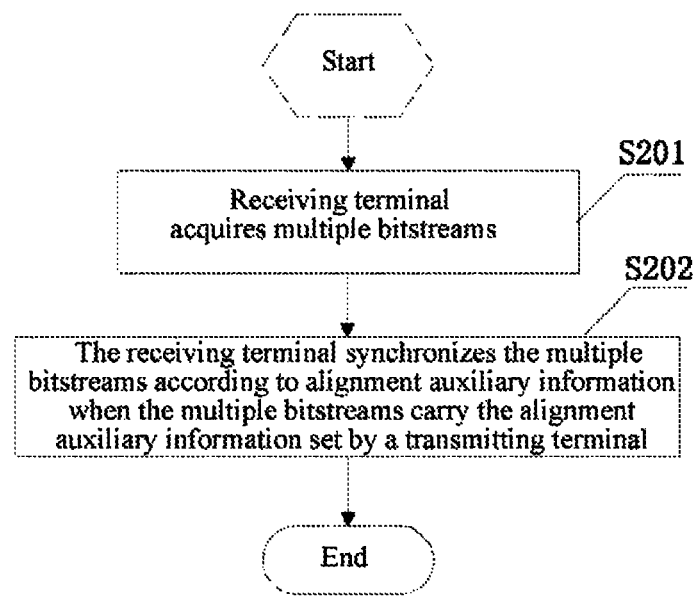
FIG. 2 is a flow chart of a bitstream alignment method completed by a receiving end according to a second embodiment of the present disclosure.

In this embodiment, the operation of a receiving terminal for bitstream synchronization is as shown in FIG. 2, including the following steps.

In step 201, the receiving terminal acquires multiple bitstreams; the acquiring manner is receiving the multiple bitstreams from a transmitting terminal or a server, or directly reading the multiple bitstreams from a corresponding storage medium.

It is to be understood that, in this step, when the transmitting terminal respectively and independently transmits the multiple bitstreams to the receiving terminal, the receiving terminal respectively and independently receives various bitstreams; and when the transmitting terminal packs the multiple bitstreams into one bitstream and transmits the packed bitstream to the receiving terminal, the receiving terminal receives the one packed bitstream.

In step 202, when the multiple bitstreams carry alignment auxiliary information set by a transmitting terminal, the receiving terminal synchronizes the multiple bitstreams according to the alignment auxiliary information.

It is to be understood that the bitstreams in the embodiment may either be video bitstreams, or other bitstreams in the system layer; the embodiment does not make any restrictions on the specific bitstream types; at the same time, it should be understood that the multiple bitstreams in the embodiment may be multiple bitstreams of the same standard, and may also be multiple bitstreams of different standards, which depends on the specific application scenarios. In the following, the embodiment is exemplarily illustrated by taking the video bitstreams as an example.

In this embodiment, the receiving terminal, after receiving the bitstreams, searches the alignment auxiliary information in at least one of a video layer, a system layer and an application layer of the multiple bitstreams. For example, when there is an agreement between the transmitting and receiving terminals about which layer or several layers that the alignment auxiliary information needs to be added in when alignment or synchronization is needed, it only needs to search the alignment auxiliary information in this layer or these layers. Otherwise, the alignment auxiliary information needs to be searched in the application layer, the system layer and the video layer of the bitstreams in sequence.

In this embodiment, when inconsistent alignment auxiliary information exists in multiple layers of one bitstream, the alignment auxiliary information of one layer is selected from the alignment auxiliary information according to a preset rule for synchronization processing. The preset rule of this embodiment includes, but is not limited to:

selecting alignment auxiliary information in a layer with a high channel transmission reliability; for example, when both the application layer and the video layer have the alignment auxiliary information, and the alignment auxiliary information are inconsistent, but the channel transmission reliability of the application layer is higher than the channel transmission reliability of the video layer, then the alignment auxiliary information of the application layer is selected;

or, when alignment auxiliary information exists in the video layer, selecting the alignment auxiliary information in the video layer; otherwise, selecting the alignment auxiliary information in a layer closest to the video layer; for example, when alignment auxiliary information exists in both the video layer and the application layer and they are inconsistent, then the alignment auxiliary information of the video layer is selected; when the alignment auxiliary information does not exist in the video layer, while inconsistent alignment auxiliary information exists in the system layer and the application layer, then the alignment auxiliary information in the layer closer to the video layer is selected;

or, selecting the alignment auxiliary information in an effective layer supported by the receiving terminal; the effective layer supported by the receiving terminal in the embodiment refers to a layer needing to be decoded by the receiving terminal, while a layer that is directly discarded without needing to be decoded by the receiving terminal is an invalid layer relative to the receiving terminal. For example, when the receiving terminal directly discards SEI in the video layer, and when the alignment auxiliary information exists in SEI fields of both the application layer and the video layer, the receiving terminal directly selects the alignment auxiliary information in the application layer. If there is no effective layer supported by the receiving terminal in the layer with the alignment auxiliary information, then the receiving terminal may not conduct synchronization processing.

It should be understood that in addition to the two preset rules of the above-mentioned examples in the embodiment, the user may further customize other rules according to the application scenarios or other factors, as long as the effective alignment auxiliary information can be selected to complete the alignment or synchronization operation.

Moreover, in this embodiment, when completed alignment auxiliary information exists in a layer of one bitstream with a relatively lower channel transmission reliability, while alignment auxiliary information existing in the layer with a relatively higher channel transmission reliability incomplete or missing, the alignment auxiliary information of the layer with the relatively lower channel transmission reliability is selected for synchronization processing; for example, when the alignment auxiliary information of the application layer is incomplete or missing, but the alignment auxiliary information of the video layer is completed, although the channel transmission reliability of the application layer is higher than the channel transmission reliability of the video layer, the alignment auxiliary information of the video layer is selected.

Alternatively, when completed alignment auxiliary information exists in other layer of one bitstream excluding the video layer, while the alignment auxiliary information lacks in the video layer, the alignment auxiliary information of the other layer excluding the video layer is selected for synchronization processing. For example, when the alignment auxiliary information of the video layer is incomplete or missing, while the alignment auxiliary information of the application layer is completed, then the alignment auxiliary information of the application layer is selected.

In this embodiment, the alignment auxiliary information set by the transmitting terminal at least includes an alignment scalar content, or when the alignment auxiliary information includes an alignment scalar content, it further includes alignment instruction information. The alignment scalar content in the embodiment includes at least one of picture absolute time information (i.e., a system time when hybrid coding is performed), picture relative time information, picture decoding sequence information, picture playing sequence information, a picture delimiter, and a picture specific delimiter. When the alignment auxiliary information includes the alignment instruction information, the alignment instruction information may specifically be alignment flag information and/or type information. The receiving terminal then performs synchronization processing on the multiple bitstreams according to the alignment scalar content.

Alternatively, the multiple bitstreams in the embodiment are specifically set to be two video bitstreams of different video standards, and one video bitstream is a video bitstream of H.265/HEVC and the other video bitstream is a non video bitstream of H.265/HEVC, for instance, a video bitstream of H.263/AVC, a video bitstream of MPEG-2, a video bitstream of MPEG-4, a video bitstream of VC-1, a video bitstream of VP8, a video bitstream of AVS, etc. The multiple bitstreams in this embodiment may also be specifically configured as two video bitstream of the same video standard, and one video bitstream (for example, the base layer) is the video bitstream of H.265/HEVC, and the other video bitstream (for example, the enhancement layer) is also the video bitstream of H.265/HEVC.

Third Embodiment

Figure 3:
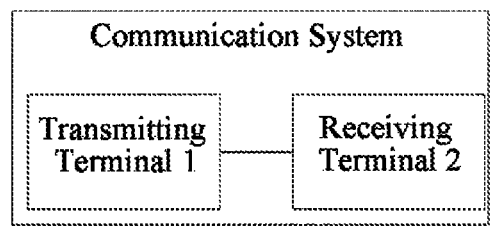
FIG. 3 is a schematic diagram of a communication system according to a third embodiment of the present disclosure.
Figure 4:
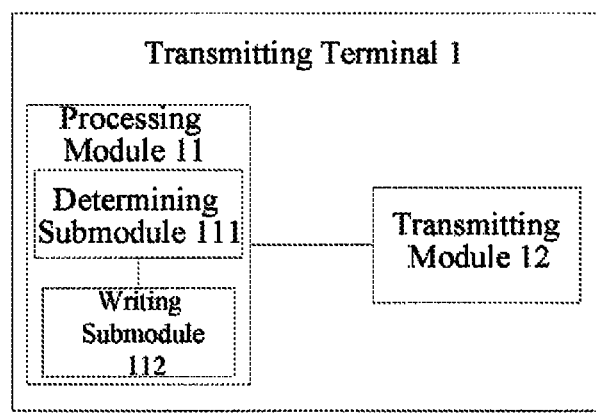
FIG. 4 is a structural schematic diagram of a transmitting terminal according to the third embodiment of the present disclosure.
Figure 5:
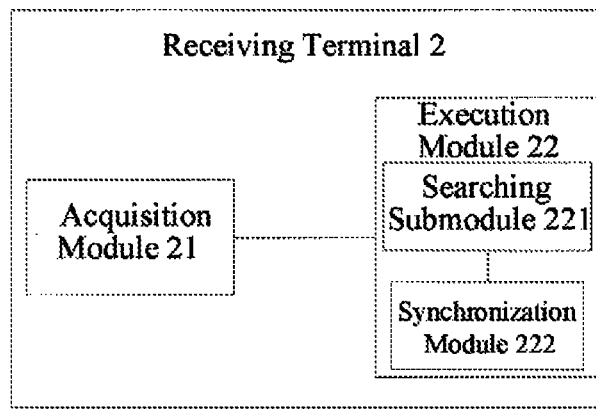
FIG. 5 is a structural schematic diagram of a receiving terminal according to the third embodiment of the present disclosure.

As shown in FIG. 3, the present embodiment provides a communication system, which includes a transmitting terminal 1 and a receiving terminal 2, wherein structures of the transmitting terminal 1 and the receiving terminal 2 are as shown in FIG. 4 and FIG. 5 respectively.

As shown in FIG. 4, the transmitting terminal 1, i.e., a source device, includes a processing module 11 and a transmitting module 12.

The processing module 11 is configured to, when current multiple bitstreams need to be aligned, set alignment auxiliary information in the multiple bitstreams; when setting the alignment auxiliary information in various bitstreams, existing information in the bitstreams may be directly used as the alignment auxiliary information, or new contents may be added in the bitstreams and used as the alignment auxiliary information.

The transmitting module 12 is configured to store the multiple bitstreams, or transmit the multiple bitstreams to a receiving terminal. When storing, the multiple bitstreams may either be stored locally in the transmitting terminal, or stored on a server. Moreover, the multiple bitstreams may be written into one file for storage, or the multiple bitstreams may be respectively written into independent files for storage, or the multiple bitstreams may be split and recombined, and then written into different files for storage. When transmitting, the multiple bitstreams may be flexibly, respectively and independently sent to the receiving terminal according to the specific application scenarios; or the multiple bitstreams may be packed into one bitstream and then transmitted to the receiving terminal; or, the multiple bitstreams may be split and recombined into multiple bitstreams, and then transmitted to the receiving terminal.

The processing module 11 specifically includes a determining submodule 111 and a writing submodule 112; the determining submodule 111 is configured to determine whether the current multiple bitstreams need to be aligned according to an application demand. The application demand may be determined according to the specific demand of a user or specific application environment or other factors, for example, whether a coder uses an AVC picture of a base layer as a reference for an HEVC picture of an enhancement layer, or whether the AVC picture and the HEVC picture need to be outputted synchronously. The writing submodule 112 is configured to write the alignment auxiliary information into a corresponding position of the bitstream.

It is to be understood that the bitstreams in the embodiment may either be video bitstreams, or other bitstreams in the system layer; the embodiment does not make any restrictions on the specific bitstream types; at the same time, it should be understood that the multiple bitstreams in the embodiment may be multiple bitstreams of the same standard, and may also be multiple bitstreams of different standards, which depends on the specific application scenarios. In the following, the embodiment is exemplarily illustrated by taking the video bitstreams as an example.

The writing submodule 112 is configured to set the alignment auxiliary information in at least one of a video layer, a system layer and an application layer of the multiple bitstreams respectively. To be specific, when the transmitting terminal sets the alignment auxiliary information in the video layer of the multiple bitstreams, the method includes the step of setting the alignment auxiliary information in at least one of the following fields of the video layer:

(1) a field corresponding to enhancement information;
(2) a field corresponding to video usability information;
(3) a field corresponding to video shared information;
(4) a field corresponding to slice header information; and
(5) other field of the video layer of the bitstream excluding the above fields, said field at least including one picture (frame picture or filed picture); and when the transmitting terminal sets the alignment auxiliary information in the system layer of the multiple bitstreams, the method specifically includes setting the alignment auxiliary information in the following fields of the system layer:

(6) a field in the system layer for describing a video media attribute; and when the transmitting terminal sets the alignment auxiliary information in the application layer of the multiple bitstreams, the method includes the step of setting the alignment auxiliary information in at least one of the following fields:

(7) a field in a media file for describing a video media attribute; and
(8) a field in the application layer for describing a video media attribute.

The writing submodule 112 may set the alignment auxiliary information in any one of the above fields of various video bitstreams, or may set the alignment auxiliary information in multiple fields of the above fields of various video bitstreams at the same time. For one video bitstream, the alignment auxiliary information may be theoretically set in any field of any layer mentioned above. However, in order to further improve the reliability and avoid missing or lacking of the alignment auxiliary information caused by factors like transmission errors, the alignment auxiliary information may also be set in multiple fields at the same time. For example, the alignment auxiliary information may be set in at least one field of at least two of the video layer, the system layer, and the application layer of one bitstream.

Moreover, the positions at which the writing submodule 112 in the embodiment sets the alignment auxiliary information in various video bitstreams may be the same or different; for example, when the multiple bitstreams are two video bitstreams of different standards, the alignment auxiliary information may be set at the same position for the two video bitstream, for example, the alignment auxiliary information may be set in the field corresponding to enhancement information of the video layer for both of the two video bitstreams; the alignment auxiliary information may also be set in different positions; for example, the alignment auxiliary information of one bitstream is set in the field corresponding to enhancement information of the video layer, and the alignment auxiliary information of the other bitstream is set in the field corresponding to video shared information of the video layer; for another example, the alignment auxiliary information of one bitstream is set in the field of the system layer for describing the video media attribute, and the alignment auxiliary information of the other bitstream is set in the field of the application layer for describing the video media attribute.

In this embodiment, the contents of the alignment auxiliary information set by the writing submodule 112 in the multiple bitstreams may be the same or different, as long as the contents can characterize that an alignment operation needs to be performed and the contents can be correctly identified.

In this embodiment, the numbers of the alignment auxiliary information set by the writing submodule 112 in the multiple bitstreams may be the same or different, for example, when the multiple bitstreams are two video bitstreams of different standards, one alignment auxiliary information may be set in one of the two video bitstreams, and multiple alignment auxiliary information may be set in the other bitstream. The contents of the multiple alignment auxiliary information set in the same layer for one bitstream are the same.

In this embodiment, the alignment auxiliary information set by the writing submodule 112 at least includes an alignment scalar content, or further includes alignment instruction information except including the alignment scalar content. The alignment scalar content in the embodiment includes at least one of picture absolute time information (i.e., a system time when hybrid coding is performed), picture relative time information, picture decoding sequence information, picture playing sequence information, a picture delimiter, and a picture specific delimiter. When the alignment auxiliary information includes the alignment instruction information, the alignment instruction information may specifically be alignment flag information and/or type information.

As shown in FIG. 5, the receiving terminal 2 includes an acquisition module 21 and an execution module 22.

The acquisition module 21 is configured to acquire multiple bitstreams; and the acquiring manner is that the multiple bitstreams may be received from a transmitting terminal or a server, or directly read from a corresponding storage medium.

The execution module 22 is configured to, when the multiple bitstreams carry alignment auxiliary information set by a transmitting terminal, synchronize the multiple bitstreams according to the alignment auxiliary information.

The execution module 22 includes a searching submodule 221 configured to search the alignment auxiliary information from at least one of an application layer, a system layer and a video layer of the multiple bitstreams. When the searching submodule 221 finds that inconsistent alignment auxiliary information exists in multiple layers of one bitstream, the alignment auxiliary information of one layer is selected from the alignment auxiliary information according to a preset rule for synchronization processing. The preset rule of the embodiment includes, but is not limited to:

selecting alignment auxiliary information in a layer with a high channel transmission reliability; for example, when inconsistent alignment auxiliary information exists in both the application layer and the video layer, and the channel transmission reliability of the application layer is higher than the channel transmission reliability of the video layer, then the alignment auxiliary information of the application layer is selected;

or, when alignment auxiliary information exists in the video layer, selecting the alignment auxiliary information in the video layer; otherwise, selecting the alignment auxiliary information in a layer closest to the video layer; for example, when both the video layer and the application layer have the alignment auxiliary information, and the alignment auxiliary information is inconsistent, then the alignment auxiliary information of the video layer is selected; when the alignment auxiliary information does not exist in the video layer, while the inconsistent alignment auxiliary information exists in the system layer and the application layer, then the alignment auxiliary information in the layer closer to the video layer is selected;

or, selecting the alignment auxiliary information in an effective layer supported by the receiving terminal; the effective layer supported by the receiving terminal in the embodiment refers to a layer needing to be decoded by the receiving terminal, while a layer that is directly discarded without needing to be decoded by the receiving terminal is an invalid layer relative to the receiving terminal. For example, when the manner of processing the SEI in the video layer by the receiving terminal is directly discarding it, and the alignment auxiliary information exists in the SEI fields of both the application layer and the video layer, then the receiving terminal directly selects the alignment auxiliary information in the application layer. If there is no effective layer supported by the receiving terminal in the layer with the alignment auxiliary information, then the receiving terminal may not conduct the synchronization processing.

It should be understood that the user may further customize other rules according to the application scenarios or other factors excluding the two preset rules of the above-mentioned examples in the embodiment, as long as the effective alignment auxiliary information can be selected to complete the alignment or synchronization operation.

Moreover, in the embodiment, when the searching submodule 221 finds that completed alignment auxiliary information exists in a layer of one bitstream with relatively lower channel transmission reliability, while the layer with high channel transmission reliability lacks the alignment auxiliary information, the alignment auxiliary information of the layer with relatively lower channel transmission reliability is selected for synchronization processing; for example, when the alignment auxiliary information of the application layer is incomplete or missing, but the alignment auxiliary information of the video layer is completed, although the channel transmission reliability of the application layer is higher than the channel transmission reliability of the video layer, the alignment auxiliary information of the video layer is selected.

Or, when completed alignment auxiliary information exists in other layer of one bitstream excluding the video layer, while the alignment auxiliary information in the video layer is incomplete or missing, the alignment auxiliary information of the other layer excluding the video layer is selected for synchronization processing. For example, when the alignment auxiliary information of the video layer is incomplete or missing, while the alignment auxiliary information of the application layer is completed, then the alignment auxiliary information of the application layer is selected.

The execution module 22 further includes a synchronization submodule 222 configured to conduct a synchronization processing on the multiple bitstreams according to the alignment scalar content.

It should be understood that the functions of each module and sub-module in the embodiment may be implemented by using dedicated hardware, software, or a combination of hardware and software. The hardware or dedicated hardware may include an application specific integrated circuit (ASIC), various other circuits, various processors, and the like. When being implemented by a processor, the functions may be provided by a single dedicated processor, a single shared processor, or multiple independent processors (some of which may be shared). In addition, the processor should be exclusively interpreted as the hardware capable of executing software; and it may implicitly include, but is not limited to, digital signal processor (DSP) hardware, read-only memory (ROM) for storing software, random access memory (RAM), and non-volatile storage device.

The terminal in the embodiment may be a related bitstream receiving and playing device in a video communication application, such as a mobile phone, a computer, a server, a set-top box, a portable mobile terminal, a digital camera, a television broadcast system device, or the like. The device may be located in a host device, and the processing device may process at least one of the following multilayer video signals: scalable videos, multi-view videos, multi-view depths, multi-view videos+multi-view depths. A stereoscopic video is a special form of the multi-view videos whose view number is equal to 2.

Fourth Embodiment

In order to better understand the present disclosure, several specific application scenarios are taken as examples to further illustrate the present disclosure.

First Example

In this example, a load type (Payload Type) of an SEI is pic_alignment_type, and the control range thereof is a picture using the SEI. When the load type is an SEI unit of time information, the time information is further given by using the bit field in Table 3.

In this example, transmission of video bitstreams with different coding formats mainly includes the following steps.

In step 1, a source device (i.e., a transmitting terminal) determines whether it is necessary to conduct an alignment operation on the videos with different coding formats according to an application demand (for example, whether a coder uses an AVC picture of a base layer as a reference for an HEVC picture of an enhancement layer, or whether the AVC picture and the HEVC picture need to be outputted synchronously).

If it is needed to use the alignment information, an HEVC coder in the source device codes one time_code type SEI unit (Time code SEI message), i.e., the payloadType of the SEI is equal to 136. An AVC coder in the source device codes one pic_timing type SEI unit (Picture timing SEI message), i.e., the payloadType of the SEI is equal to 1.

If the alignment information is not needed to be used, then the SEI unit is not set.

In step 2, the source device uses a coding method corresponding to u(n) to write values of the payloadType in different coding protocols into a SEI packet header of an AVC video bitstream and an SEI packet header of an HEVC video bitstream respectively.

In step 3, the source device acquires a system time (i.e., picture absolute time information) when the current coder performs a hybrid coding, and writes the time information into a payload field of the SEI of the AVC video bitstream and a payload field of the SEI of the HEVC video bitstream respectively as alignment information.

In step 4, a host device (i.e., a receiving terminal), after receiving the bitstreams, searches SEI data in the AVC video bitstream and the HEVC video bitstream respectively.

In step 5, the host device uses a decoding method corresponding to u(n) to acquire the payloadType values from the SEI packet header of the AVC video bitstream and the SEI packet header of the HEVC video bitstream respectively, and determines whether there is the time information (the payloadType is equal to 1 for the pic_timing type in AVC, and the payloadType is equal to 136 for the time_code type in HEVC).

In step 6, if there is the time information, the host device obtains the fields shown in the corresponding Table 3 according to the payloadType, and uses a corresponding decoding method to acquire the time information of the AVC picture and the HEVC picture from the bitstreams respectively.

In step 7, the host device determines whether the pictures in different coding formats need to be synchronized according to the acquired time information.

In step 8, if the synchronization is needed, i.e., the time information acquired by AVC and HEVC is consistent, the host device puts reconstructed picture decoded by the current AVC decoder into a reference frame management list of the HEVC for being used by the HEVC decoder. For a multi-view application, the host device uses this information to conduct synchronous output and display operations on pictures of different viewpoints.

Second Example

In this example, vui_timing_info_present_flag in the load type of the VUI is pic_alignment_flag, and the control range thereof is a picture using the VUI. When the vui_timing_info_present_flag is 1, the bit field of Table 3 is used to further give the time information.

In this example, transmission of video bitstreams with different coding formats mainly includes the following steps.

In step 1, a source device determines whether it is necessary to conduct an alignment operation on videos with different coding formats according to an application demand (for example, whether a coder uses an AVC picture of the base layer as a reference for the HEVC picture of the enhancement layer, or whether the AVC picture and the HEVC picture need to be outputted synchronously).

If it is needed to use alignment information, the HEVC coder in the source device codes one VUI unit, wherein the vui_timing_info_present_flag in the VUI is equal to 1. The AVC coder in the source device codes one VUI unit, wherein the vui_timing_info_present_flag in the VUI is equal to 1.

If it is not needed to use the alignment information, then the vui_timing_info_present_flag is equal to 0.

In step 2, the source device uses a coding method corresponding to u(1) to write the value of the vui_timing_info_present_flag into the VUI of an AVC video bitstream and the VUI of a HEVC video bitstream respectively.

In step 3, the source device acquires the system time when the current coder performs hybrid coding, and writes the time information into a time information field of the VUI of the AVC video bitstream and a time information field of the VUI of the HEVC video bitstream respectively as the alignment information.

In step 4, a host device, after receiving the bitstreams, searches VUI data in the AVC video bitstream and HEVC video bitstream respectively.

In step 5, the host device uses a decoding method corresponding to u(1) to acquire values of the vui_timing_info_present_flag from the VUI of the AVC video bitstream and the VUI of the HEVC video bitstream respectively, and determines whether there is time information (whether the vui_timing_info_present_flag is equal to 1).

In step 6, if there is time information (the vui_timing_info_present_flag is equal to 1), the host device uses a corresponding decoding method to acquire the time information of the AVC picture and the HEVC picture from the bitstreams respectively according to the fields shown in the corresponding Table 3.

In step 7, the host device determines whether the pictures in different coding formats need to be synchronized according to the acquired time information.

In step 8, if synchronization is needed, i.e., the time information acquired by AVC and HEVC is consistent, the host device puts the reconstructed picture decoded by the current AVC decoder into a reference frame management list of the HEVC for the HEVC decoder to use. For a multiple-viewpoint application, the host device uses this information to conduct synchronous output and display operations on pictures of different viewpoint.

Third Example

In this example, extension_flag in the field corresponding to video shared information (i.e., a field corresponding to a parameter set) is namely pic_alignment_flag, and the control range thereof is a picture using the parameter set. When the extension_flag corresponding to the parameter set is 1, extension_data is namely alignment_code, and the time information is further given by using the bit field in Table 3. The operation methods of the source device and the host device on the pic_alignment_flag and alignment_code are similar to that in the second example.

Different from the second example, in the present example, a user may define the time information independently, and the rules may be unified by the source device and the host device through negotiation.

For example:

the control range of a video parameter set (VPS) is a multi-frame picture, then the video parameter set may both store the time information of a one-frame picture, and the time information of the multi-frame picture;

the control range of a sequence parameter set (SPS) is a multi-frame picture, then the sequence parameter set may both store the time information of the one-frame picture, and the time information of the multi-frame picture; and the control range of a picture parameter set (PPS) is a one-frame picture, then the time information of the one-frame picture is stored in the picture parameter set.

The positions of the time information appearing in the video parameter set, the sequence parameter set and the picture parameter set may be in any combination. The set time information may be the same, or may be generated by combination.

Fourth Example

In this example, slice_segement_header_extension_present_flag in a field corresponding to slice header information is pic_alignment_flag namely. When the slice_segement_header_extension_present_flag is 1, slice_segment_header_extension_data is namely alignment_code, and the time information is further given by using the bit field in Table 3. The operation methods of the source device and the host device on the pic_alignment_flag and alignment_code are similar to that in the second example.

The present example is different from the second example in that the position of the time information is not in the control range of the entire frame of picture, but is in a slice (Slice). It is required that the time information of slices in the same frame of picture has to be consistent. Moreover, the user may define the time information independently, and the rules may be unified by the source device and the host device through negotiation.

Fifth Example

In this example, the alignment auxiliary information is located in other data structure having an effective range at least including one picture (frame picture and/or field picture); for the other data structure having the effective range at least including one picture (frame picture and/or field picture), if the data structure includes data information that has to be used in other decoding process, then the data structure is the data structure required in the decoding process. If the data structure uses type information similar to pic_alignment_type, then the operation methods of the source device and the host device on the pic_alignment_type and alignment_code are similar to that in the first example. If the data structure uses a flag similar to pic_alignment_flag, then the operation methods of the source device and the host device on the pic_alignment_flag are similar to that in the second example.

The present example differs from the first example and the second example in that the source device uses a corresponding coding method to write the pic_alignment_flag and/or pic_alignment_type, and the alignment_code into a corresponding bitstream of the data structure at least including one picture (frame picture and/or field picture), and the host device uses a corresponding decoding method to parse fields corresponding to the pic_alignment_flag and/or pic_alignment_type, and the alignment_code from the corresponding bitstream of the data structure at least including one picture (frame picture and/or field picture) to acquire the values of the fields.

Sixth Example

In this example, alignment or synchronization information is located in a system layer, such as a MPEG-2 TS (Transport Stream) layer, PTS_DTS_flags is namely pic_alignment_flag, and is located in a PES_packet of TS. The control range thereof is the Transport Stream to which the current PES belongs. The PTS_DTS_flags is equal to 2, representing that there is time information PTS (Presentation Time Stamps) subsequently. The PTS_DTS_flags is equal to 3, representing that there are time information PTS and DTS (Decoding Time Stamps) subsequently. The PTS_DTS_flags is equal to 0, representing that there is no time information PTS or DTS subsequently.

The bit field in Table 3 is used after the PTS_DTS_flags field to further give the time information.

In this example, transmission of video bitstream with different coding formats mainly includes the following steps.

In step 1, the source device determines whether it is necessary to conduct an alignment operation on the videos with different coding formats according to an application demand (for example, whether the coder uses the AVC picture of the base layer as a reference for the HEVC picture of the enhancement layer, or whether the AVC picture and the HEVC picture need to be outputted synchronously).

If alignment information is needed to be used, the source device sets the PTS_DTS_flags as 2 or 3; otherwise, the source device sets the PTS_DTS_flags as 0.

In step 2, the source device uses a corresponding coding method to write the value of the PTS_DTS_flags into a PES packet header of MPEG-2TS for packing the video bitstream of AVC and a PES packet header of MPEG-2TS for packing the video bitstream of HEVC. At this time, the video bitstreams of non-HEVC and the video bitstreams of HEVC are in different TS packets.

In step 3, the source device acquires the system time when the current coder performs hybrid coding, and writes the time information into the PES packet header of MPEG-2TS for packing the video bitstream of AVC and the PES packet header of MPEG-2TS for packing the video bitstream of HEVC respectively as alignment information.

In step 4, after receiving the bitstreams, the source device searches PTS_DTS_flags in the PES packet header of MPEG-2 TS for packing the video bitstream of AVC and the PES packet header of MPEG-2 TS for packing the video bitstream of HEVC respectively.

In step 5, the host device uses a corresponding decoding method to acquire the values of the PTS_DTS_flags from the PES packet header of MPEG-2 TS for packing the video bitstream of AVC and the PES packet header of MPEG-2 TS for packing the video bitstream of HEVC respectively, and determines whether there is time information (whether the PTS_DTS_flags is equal to 2 or 3).

In step 6, if there is the time information (the PTS_DTS_flags is equal to 2 or 3), the host device uses a corresponding decoding method to acquire the time information in the PES packet header of MPEG-2 TS for packing the video bitstream of AVC and the PES packet header of MPEG-2 TS for packing the video bitstream of HEVC respectively according to the fields shown in the corresponding Table 3.

In step 7, the host device determines whether the pictures in different coding formats need to be synchronized according to the acquired time information.

In step 8, if synchronization is needed, i.e., the time information acquired by AVC and HEVC is consistent, the host device puts the reconstructed picture decoded by the current AVC decoder into the reference frame management list of the HEVC for the HEVC decoder to use. For a multiple viewpoint application, the host device uses this information to conduct synchronous output and display operations on pictures of different viewpoint.

Seventh Example

In this example, the above-mentioned alignment auxiliary information is located in a field corresponding to a video media attribute of a file; when an effective range of the field corresponding to video media attribute including pic_alignment_flag and/or pic_alignment_type is the entire video bitstream with different coding formats in the bitstreams of a media file, the operation methods of the source device and the host device on the pic_alignment_flag and pic_alignment_type are similar to that in the first and second examples.

This example is different from the first and second examples in that the source device uses the corresponding coding method to write the values of the pic_alignment_flag and/or pic_alignment_type, and the alignment_code into a system bitstream corresponding to the field corresponding to the video media attribute. The host device uses the corresponding decoding method to parse the fields corresponding to the pic_alignment_flag and/or pic_alignment_type, and the alignment_code from the corresponding system bitstream of the field for describing the video media attribute, and acquire the values thereof.

Eighth Example

In this example, the above-mentioned alignment auxiliary information is located in a media data area of the application layer. When the effective range of the data area containing the pic_alignment_flag and/or pic_alignment_type is the entire video bitstreams of different coding formats in the bitstreams of the application layer, the operation methods of the source device and the host device on the pic_alignment_flag and/or pic_alignment_type are similar to those in the first and second examples.

This example is different from the first and second examples in that the source device uses the corresponding coding method to write the values of the pic_alignment_flag and/or pic_alignment_type, and the alignment_code into the system bitstream corresponding to the media data area. The host device uses the corresponding decoding method to parse the fields corresponding to the pic_alignment_flag and/or pic_alignment_type, and the alignment_code from the corresponding system bitstream of the media data area, and acquire the values thereof.

For example, the above alignment or synchronization information is written into a private data byte area (Private Data Bytes) in the bitstream of a DVB application layer containing video data of different coding formats.

The following steps are mainly included.

In step 1, the source device determines whether it is necessary to conduct an alignment operation on the videos with different coding formats according to an application demand (for example, whether the coder uses the AVC picture of the base layer as a reference for the HEVC picture of the enhancement layer, or whether the AVC picture and the HEVC picture need to be outputted synchronously).

If alignment information is needed to be used, the source device sets a private data flag (private_data_flag) as 1, an sets a private data packet header type (data_field_tag) as one of the user-defined values (0xA0 to 0xFF, not limited to this value range, and a specific defined value may be agreed by the source device and the host device); otherwise, the private_data_flag is set as 0.

In step 2, the source device uses a corresponding coding method to respectively write the value of the data_field_tag into a DVB private data area for packing the video bitstream of AVC, and a DVB private data area for packing the video bitstream of HEVC.

In step 3, the source device uses a corresponding coding method to respectively write the value of the data_field_tag into a DVB private data area for packing the video bitstream of non-AVC, and a DVB private data area for packing the video bitstream of HEVC.

In step 4, the source device acquires the system time when the current coder performs hybrid coding, and writes the time information into the DVB private data area for packing the video bitstream of AVC and the DVB private data area for packing the video bitstream of HEVC respectively as alignment information.

In step 5, after receiving the bitstreams, the host device searches and determines whether the private_data_flag exists in the DVB private data area for packing the video bitstream of AVC and the DVB private data area for packing the video bitstream of HEVC respectively.

In step 6, the host device uses a decoding method corresponding to u(1) to acquire the value of the private_data_flag from the DVB bitstream for packing the video bitstream of non-HEVC video data and the DVB bitstream for packing the video bitstream of HEVC video data, and determines whether there is private data information.

In step 7, if there is the time information (the private_data_flag is equal to 1), the host device obtains private data, and uses a corresponding decoding method to decode data_field_tag from the PES packet header of MPEG-2 TS for packing the video bitstream of AVC and the PES packet header of MPEG-2 TS for packing the video bitstream of HEVC from the bitstreams respectively; if it is the user-defined value (a certain value from 0xA0 to 0xFF, not limited to this value range) agreed with the source device, then there is time information; otherwise, there is no time information.

In step 8, if there is the time information, the host device uses a corresponding decoding method to acquire the time information from the DVB private data area containing video data of non-HEVC and the DVB private data area containing video data of HEVC according to the fields shown in Table 3.

In step 9, the host device determines whether the pictures in different coding formats need to be synchronized according to the acquired time information.

In step 10, if synchronization is needed, i.e., the time information acquired by AVC and HEVC is consistent, the host device puts a reconstructed picture, which is obtained by decoding by the current AVC decoder, into a reference frame management list of the HEVC for being used by the HEVC decoder. For a multiple viewpoint application, the host device uses this information to conduct synchronous output and display operations on pictures of different viewpoints.

Ninth Example

The above first to eighth examples are all directed to the processing when the multiple bitstreams are bitstreams of different standards. The present example illustrates the case where the multiple bitstreams are of the same standard. The alignment or synchronization processing of the multiple bitstreams in this example is similar to that of the multiple bitstreams of different standards. Two same bitstreams are illustrated hereinafter, for example: both the base layer and the enhancement layer contain video bitstreams of H.265/HEVC. At this moment, the source device determines a form of adding alignment or synchronization information into the two video bitstreams of H.265/HEVC according to an application demand. The host device acquires the required alignment or synchronization information.

The source device may use the method according to the first to eighth examples to set the values of the pic_alignment_flag and/or pic_alignment_type, and the alignment_code in a high layer data structure and a low layer data structure in the video bitstream layer, the system layer and the application layer, and uses a corresponding coding method to write the values into the bitstreams.

The host device processes the received bitstreams, and searches to acquire the values of the pic_alignment_flag and/or pic_alignment_type, and the alignment_code from the application layer, the system layer and the video bitstream layer using the method in the first to eighth examples, and converts the values into a uniform time format according to the unified agreement with the source device. The host device uses the above-mentioned methods to set an error control and play control module during receiving and decoding.

Tenth Example

In this example, the positions of the bitstreams of different videos or same video standards for carrying the above-mentioned alignment auxiliary information may be different. The source device determines the positions of adding alignment or synchronization information into the video bitstreams according to an application demand, and writes the same information format. The host device searches according to a sequence of the application layer, the system layer, and the video encoding layer until the required alignment or synchronization information is acquired.

When using the hybrid method, the source device firstly determines the alignment manner of various bitstreams with different video standards or the same video standard according to the application demand, including determining the layer where the alignment information locates, and a data form of the alignment information. The source device uses the method in the first to eighth examples to set the values of the pic_alignment_flag and/or pic_alignment_type, and the alignment_code in the high layer data structure and the low layer data structure in the video bitstream layer, the system layer and the application layer according to the above determined information, and uses a corresponding coding method to write the values into the bitstream.

The host device processes the received bitstreams, and searches to acquire the values of the pic_alignment_flag and/or pic_alignment_type, and the alignment_code from the application layer, the system layer and the video bitstream layer using the method in the first to eighth examples. The host device uses the above-mentioned methods to set an error control and play control module during receiving and decoding.

Eleventh Example

In this example, forms of the various bitstreams with different video standards or same video standard for carrying the above-mentioned alignment auxiliary information may be different. The source device determines the forms of adding alignment or synchronization information into various bitstreams of different video standards or same video standard according to an application demand. The rule is unified by the source device and the host device through negotiation, for example, the time information is uniformly converted into the system time, or the number is unified. The host device searches according to a sequence of the application layer, the system layer, and the video encoding layer until the required alignment or synchronization information is acquired.

In the used hybrid method, the source device firstly determines the alignment methods of various bitstreams with different video standards or same video standard according to the application demand, including determining the layer where the alignment or synchronization information locates, and a data form. The source device uses the method in the first to eighth examples to set the values of the pic_alignment_flag and/or pic_alignment_type, and the alignment_code in the high layer data structure and the low layer data structure in the video bitstream layer, the system layer and the application layer according to the above determined information, and uses a corresponding coding method to write the values into the bitstream.

The host device processes the received bitstreams, and searches to acquire the values of the pic_alignment_flag and/or pic_alignment_type, and the alignment_code from the application layer, the system layer and the video bitstream layer using the method in the first to eighth examples, and converts the values into a uniform time format according to the unified agreement with the source device. The host device uses the above-mentioned methods to set an error control and play control module during receiving and decoding.

Twelfth Example

In the example, the hybrid method is used to carry the above-mentioned alignment auxiliary information. For the various bitstreams with different video standards or same video standard, the application layer is a data structure higher than the system layer, and the system layer is a data structure higher than the video coding layer.

In the example, the pic_alignment_flag and/or pic_alignment_type, and the alignment_code may be coded in the data structures with different levels. When the values of the pic_alignment_flag and/or pic_alignment_type, and the alignment_code in the high layer data structure and the low layer data structure are different, the values in the low layer data structure cover the values in the high layer data structure. When the values of the pic_alignment_flag and/or pic_alignment_type, and the alignment_code in the low layer data structure are incomplete or missing, the values in the high layer data structure may be borrowed for alignment or synchronization.

In the hybrid methods used, the source device firstly determines the alignment methods of various bitstreams with different video standards or same video standard according to the application demand, including determining the layer where the alignment or synchronization information locates, and the data form. The source device uses the method in the first to eighth examples to set the values of the pic_alignment_flag and/or pic_alignment_type, and the alignment_code in the high layer data structure and the low layer data structure in the video bitstream layer, the system layer and the application layer according to the information determined, and uses a corresponding coding method to write the values into the bitstream.

The host device processes the received bitstreams, and acquires the values of the pic_alignment_flag and/or pic_alignment_type, and the alignment_code from the application layer, the system layer and the video bitstream layer using the method in the first to eighth examples. The host device uses the above-mentioned methods to set an error control and play control module during receiving and decoding.

The host device may use the alignment or synchronization information acquired from different layers as a condition for bitstream error detection and play control condition thereof. If there is a difference among the alignment or synchronization information acquired from different layers, the host device executes an error control mechanism to report an error to the source device through feedback information. The host device may directly conduct output and play control between the picture of this layer and the pictures of other layers according to the alignment or synchronization information.

In conclusion, descriptions of video alignments in different coding formats may be added in descriptions of a high layer, the system layer and the video layer of bitstreams through the method provided by the embodiments of the present disclosure. Meanwhile, a layered description mechanism is used in the high layer structure of bitstreams, which is beneficial for the flexible control during the bitstream generation process.

It will be apparent to those skilled in the art that the above-described modules or steps of the present disclosure may be implemented by a general purpose computing device which may be focused on a single computing device or distributed over a network consisting of a plurality of computing devices, which may optionally be implemented by a program code executable by the computing device, so that they may be stored in a storage device for executing by the computing device and, in some cases, the steps shown or described herein may be performed in a different sequence; or they are achieved by separately making them into individual integrated circuit modules, or by making multiple modules or steps in them into a single integrated circuit module. Thus, the present disclosure is not limited to any particular combination of hardware and software.

The foregoing is further detailed descriptions of the present disclosure with reference to the specific embodiments, and it should not be considered that the embodiments of the present disclosure are limited to these descriptions. For those skilled in the art, some simple deduction or replacement can be made without the concept of the disclosure, which shall all be included within the scope of protection of the disclosure.

INDUSTRIAL APPLICABILITY

The present disclosure is applied to the related devices for bitstream transmitting, storing or receiving and playing in video communication applications for aligning and synchronizing the video bitstreams.

What is claimed is:

1. A bitstream alignment method comprising:
when multiple bitstreams need to be aligned, setting, by a transmitting terminal, alignment auxiliary information in the multiple bitstreams; and
storing the multiple bitstreams or transmitting the multiple bitstreams to a receiving terminal, by the transmitting terminal,
wherein the multiple bitstreams are video bitstreams, and the receiving terminal searches alignment auxiliary information from at least one of an application layer, a system layer and a video layer of the multiple bitstreams, and
wherein when inconsistent alignment auxiliary information exists in multiple layers of one bitstream, the alignment auxiliary information from at least one of an application layer, a system layer and a video layer of the one bitstream is selected according to a preset rule for synchronization processing,
wherein the preset rule comprises:
selecting the alignment auxiliary information with a high channel transmission reliability; or
when the alignment auxiliary information exists in the video layer, selecting the alignment auxiliary information in the video layer, and when no alignment auxiliary information exists in the video layer, selecting the alignment auxiliary information in a layer closest to the video layer; or
selecting the alignment auxiliary information in an effective layer supported by the receiving terminal.

2. The bitstream alignment method according to claim 1, wherein the multiple bitstreams are video bitstreams; and setting, by the transmitting terminal, the alignment auxiliary information in the multiple bitstreams comprises: setting the alignment auxiliary information in at least one of the video layer, the system layer and the application layer of the multiple bitstreams.

3. The bitstream alignment method according to claim 2, wherein setting, by the transmitting terminal, the alignment auxiliary information in the video layer of the multiple bitstreams comprises: setting the alignment auxiliary information in at least one field of following fields of the video layer:
a field corresponding to enhancement information;
a field corresponding to video usability information;
a field corresponding to video shared information; a field corresponding to slice header information; and
other field of the video layer of the multiple bitstreams excluding the above fields, the other field comprising at least one picture.

4. The bitstream alignment method according to claim 2, wherein setting, by the transmitting terminal, the alignment auxiliary information in the system layer of the multiple bitstreams comprises: setting the alignment auxiliary information in a field of the system layer to describe a video media attribute; or setting the alignment auxiliary information in a field of a media file to describe a video media attribute, and/or in a field of the application layer to describe a video media attribute.

5. The bitstream alignment method according to claim 2, wherein positions of the alignment auxiliary information in the multiple bitstreams are set to be a same position by the transmitting terminal; or contents of the alignment auxiliary information in the multiple bitstreams are set to be a same content by the transmitting terminal; or numbers of the alignment auxiliary information in the multiple bitstreams are set to be different by the transmitting terminal; or contents of the alignment auxiliary information in the multiple bitstreams are set to be different by the transmitting terminal; or positions of the alignment auxiliary information in the multiple bitstreams are set to be a same position by the transmitting terminal, and contents of the alignment auxiliary information in the multiple bitstreams are set to be a same content by the transmitting terminal; or numbers of the alignment auxiliary information in the multiple bitstreams are set to be different by the transmitting terminal, and contents of the alignment auxiliary information in the multiple bitstreams are set to be different by the transmitting terminal.

6. The bitstream alignment method according to claim 1, wherein the transmitting the multiple bitstreams to the receiving terminal by the transmitting terminal comprises: transmitting, by the transmitting terminal, the multiple bitstreams respectively and independently to the receiving terminal; or packing at least two of the multiple bitstreams into a packed bitstream and then transmitting the packed bitstream to the receiving terminal, by the transmitting terminal; or splitting and recombining the multiple bitstreams into multiple bitstreams and then transmitting the multiple bitstreams to the receiving terminal, by the transmitting terminal.

7. The bitstream alignment method according to claim 1, wherein the storing the multiple bitstreams by the transmitting terminal comprises:
    writing the multiple bitstreams into one file for storing, or respectively writing the multiple bitstreams into independent files for storing, or
    when there are multiple bitstreams, splitting and recombining the multiple bitstreams and then writing the multiple bitstreams into different files for storing.

8. The bitstream alignment method according to claim 2, wherein the alignment auxiliary information comprises an alignment scalar content, or further comprises alignment instruction information when comprising an alignment scalar content.

9. The bitstream alignment method according to claim 8, wherein when the alignment auxiliary information comprises an alignment scalar content, the alignment scalar content comprises at least one of picture absolute time information, picture relative time information, picture decoding sequence information, picture playing sequence information, a picture separator and a picture specific delimiter; or
    wherein when the alignment auxiliary information further comprises the alignment instruction information when comprising the alignment scalar content, the alignment instruction information comprises alignment flag information and/or type information.

10. The bitstream alignment method according to claim 2, wherein the multiple bitstreams are two video bitstreams of different video standards, and one of the two video bitstreams is a video bitstream of H.265/HEVC.

11. A bitstream receiving method, comprising:
    acquiring, by a receiving terminal, multiple bitstreams; and
    when the multiple bitstreams carry alignment auxiliary information set by a transmitting terminal, synchronizing, by the receiving terminal, the multiple bitstreams according to the alignment auxiliary information,
    wherein the multiple bitstreams are video bitstreams, and the receiving terminal searches alignment auxiliary information from at least one of an application layer, a system layer and a video layer of the multiple bitstreams, and
    wherein when inconsistent alignment auxiliary information exists in multiple layers of one bitstream, the alignment auxiliary information from at least one of an application layer, a system layer and a video layer of the one bitstream is selected according to a preset rule for synchronization processing,
    wherein the preset rule comprises:
    selecting the alignment auxiliary information in a layer with a high channel transmission reliability; or
    when the alignment auxiliary information exists in the video layer, selecting the alignment auxiliary information in the video layer, and when no alignment auxiliary information exists in the video layer, selecting the alignment auxiliary information in a layer closest to the video layer; or
    selecting the alignment auxiliary information in an effective layer supported by the receiving terminal.

12. The bitstream receiving method according to claim 11, wherein when completed alignment auxiliary information exists in a layer of one bitstream with a relatively low channel transmission reliability, while the alignment auxiliary information existing in a layer with a relatively high channel transmission reliability is incomplete or missing, the alignment auxiliary information in the layer with the relatively low channel transmission reliability is selected for synchronization processing; or
    when completed alignment auxiliary information exists in other layer of one bitstream excluding the video layer, while alignment auxiliary information existing in the video layer is incomplete or missing, the alignment auxiliary information in the other layer excluding the video layer is selected for synchronization processing.

13. The bitstream receiving method according to claim 11, wherein the alignment auxiliary information at least comprises an alignment scalar content; and the receiving terminal synchronizes the multiple bitstreams according to the alignment scalar content.

14. A transmitting terminal, comprising:
    a processor; and
    a memory for storing instructions executable by the processor,
    wherein the processor is configured to:
    when multiple bitstreams need to be aligned, set alignment auxiliary information in the multiple bitstreams; and
    store the multiple bitstreams, or transmit the multiple bitstreams to a receiving terminal, wherein the multiple bitstreams are video bitstreams, and the receiving terminal searches alignment auxiliary information from at least one of an application layer, a system layer and a video layer of the multiple bitstreams, and
    wherein when inconsistent alignment auxiliary information exists in multiple layers of one bitstream, the alignment auxiliary information from at least one of an application layer, a system layer and a video layer of the one bitstream is selected according to a preset rule for synchronization processing,
    wherein the preset rule comprises:
    selecting the alignment auxiliary information in a layer with a high channel transmission reliability; or
    when the alignment auxiliary information exists in the video layer, selecting the alignment auxiliary information in the video layer, and when no alignment auxiliary information exists in the video layer, selecting the alignment auxiliary information in a layer closest to the video layer; or selecting the alignment auxiliary information in an effective layer supported by the receiving terminal.

15. The transmitting terminal according to claim 14, wherein the multiple bitstreams are video bitstreams, and the processor is further sets the alignment auxiliary information in at least one of the video layer, the system layer and the application layer of the multiple bitstreams.

16. A receiving terminal, comprising:
a processor; and
a memory for storing instructions executable by the processor,
wherein the processor is configured to:
when multiple bitstreams carry alignment auxiliary information set by a transmitting terminal, synchronize the multiple bitstreams according to the alignment auxiliary information,
wherein the multiple bitstreams are video bitstreams, and a receiving terminal searches alignment auxiliary information from at least one of an application layer, a system layer and a video layer of the multiple bitstreams, and
wherein when inconsistent alignment auxiliary information exists in multiple layers of one bitstream, the alignment auxiliary information from at least one of an application layer, a system layer and a video layer of the one bitstream is selected according to a preset rule for synchronization processing,
wherein the preset rule comprises:
selecting the alignment auxiliary information in a layer with a high channel transmission reliability; or
when the alignment auxiliary information exists in the video layer, selecting the alignment auxiliary information in the video layer, and when no alignment auxiliary information exists in the video layer, selecting the alignment auxiliary information in a layer closest to the video layer; or
selecting the alignment auxiliary information in an effective layer supported by the receiving terminal.

17. The receiving terminal according to claim 16, wherein the multiple bitstreams are video bitstreams, and wherein the processor is further searches the alignment auxiliary information from at least one of the application layer, the system layer and the video layer of the multiple bitstreams.

* * * * *